United States Patent [19]
Hyman et al.

[11] Patent Number: 6,155,838
[45] Date of Patent: Dec. 5, 2000

[54] QUESTION AND ANSWER AMUSEMENT DEVICE

[75] Inventors: Gregory E. Hyman, Boca Raton, Fla.; Robert W. Jeffway, Jr., Leeds, Mass.

[73] Assignee: Mattel, Inc., El Segundo

[21] Appl. No.: 08/912,546

[22] Filed: Aug. 18, 1997

[51] Int. Cl.[7] .................................................. G09B 7/00
[52] U.S. Cl. ........................ 434/322; 434/327; 434/362; 446/484
[58] Field of Search ................................. 434/322, 327, 434/350, 362; 446/484; 345/902

[56] References Cited

U.S. PATENT DOCUMENTS

| | | |
|---|---|---|
| 4,164,078 | 8/1979 | Goldfarb . |
| 4,247,895 | 1/1981 | Weber ...................... 434/327 |
| 4,411,628 | 10/1983 | Laughon et al. . |
| 4,421,487 | 12/1983 | Laughon et al. ........................ 434/169 |
| 4,611,995 | 9/1986 | Sado . |
| 4,611,996 | 9/1986 | Stoner . |
| 4,885,580 | 12/1989 | Noto et al. ........................... 345/920 X |
| 4,959,017 | 9/1990 | Thompson et al. . |
| 4,968,255 | 11/1990 | Lee et al. ................................. 434/159 |
| 4,990,093 | 2/1991 | Frazer et al. ............................. 434/337 |
| 5,030,101 | 7/1991 | Ikemoto et al. . |
| 5,100,329 | 3/1992 | Deesen et al. .......................... 434/327 |
| 5,122,062 | 6/1992 | Cutler et al. ............................. 434/327 |
| 5,137,457 | 8/1992 | Howard et al. . |
| 5,139,423 | 8/1992 | McCormack . |
| 5,161,977 | 11/1992 | Thomas, Jr. ............................ 434/322 |
| 5,203,705 | 4/1993 | Hardy et al. . |
| 5,289,389 | 2/1994 | Keller ...................... 702/116 |
| 5,314,340 | 5/1994 | Gaddis ..................... 434/327 |
| 5,316,485 | 5/1994 | Hirose .................... 434/322 |
| 5,413,355 | 5/1995 | Gonzalez . |
| 5,586,889 | 12/1996 | Goodman . |
| 5,632,624 | 5/1997 | Cameron et al. ........................ 434/322 |
| 5,681,170 | 10/1997 | Rieber et al. ............................ 434/355 |
| 5,727,950 | 3/1998 | Cook et al. ............................. 434/350 |
| 5,738,527 | 4/1998 | Lundberg ................................ 434/322 |
| 5,820,386 | 10/1998 | Sheppard, II ........................... 434/322 |
| 5,839,902 | 11/1998 | Wood ...................................... 434/130 |
| 5,865,677 | 2/1999 | Goldfarb et al. ........................... 463/9 |

FOREIGN PATENT DOCUMENTS 8-30684  2/1996  Japan .

*Primary Examiner*—Joe H. Cheng
*Attorney, Agent, or Firm*—Roy A. Ekstrand

[57] ABSTRACT

A housing supports a plurality of user depressible buttons including a question and answer button, a repeat or skip button and optionally a category select button. The housing further supports a multisegment liquid crystal display arranged in a linear arrangement. Within the housing, a microprocessor based circuit utilizes an associated memory and supporting apparatus such as display drivers to respond to the user pressing of buttons on the face of the housing to perform a series of question and answer operation. When the user presses the question and answer button, the microprocessor circuit assembles the next question from a stored list of questions and scrolls the question across the liquid crystal display. Thereafter, the circuit waits a predetermined interval for either the next pressing of the question answer button or expiration of a timed interval. When either occurs, the system ceases to wait and if the question and answer button has been pushed during the interval, the system displays the correct answer associated with the question. If, however, the question and answer button has not been pressed during the timed interval, the system preferably performs a negative output such as a razz signal and thereafter displays the answer. Following answer display, the system waits for the next pressing of the question and answer button to repeat the cycle.

12 Claims, 3 Drawing Sheets

QUESTION AND ANSWER AMUSEMENT DEVICE

FIELD OF THE INVENTION

This invention relates generally to electronic quiz apparatus and particularly to those configured to provide amusement and entertainment.

BACKGROUND OF THE INVENTION

Games and amusement devices are well known in the art having attained a virtually endless variety of structures, apparatus and methods. As a result, a substantial number of quiz games, memory games, puzzles, card testing games, and the like have been provided by practitioners in the art. With the advent of small, relatively low cost electronic devices such as microprocessors and relatively low cost memory devices, a virtually endless array of computerized games and quiz devices have proliferated. Using a small microprocessor and its associated memory, practitioners are able to produce devices which are physically relatively small such as handheld or desktop apparatus which are nonetheless surprisingly complex in their programming and in their game play. Utilizing this complexity and the availability of substantial memory in such devices, practitioners have provided apparatus which enables one to test various fields of knowledge and to receive answers and evaluation. In others, a further system of rewards such as amusing or entertaining sound and visual effects are provided to motivate the participant. Some devices maintain scores which allow competitive play between a plurality of players or sole participation with the motivation of achieving an ever higher score. Such computerized apparatus have also included so-called self learning or programmed learning studies which present a series of challenges and answers and which track incorrect questions for more frequent presentation until the participant successfully answers them. For example, U.S. Pat. No. 4,611,996 issued to Stoner sets forth a TEACHING MACHING having circuitry for selection and display by which problems are presented to a student. A plurality of switches are provided to receive the student's response and means are provided to evaluate the answer. Various reward mechanisms are utilized to motivate the student. Additional circuitry within the unit allows an ongoing or dynamic evaluation of the student's proficiency and allows focusing of the question areas in response to problems evidenced by frequent incorrect answers.

U.S. Pat. No. 4,411,628 issued to Laughon, et al. sets forth an ELECTRONIC LEARNING AID WITH PICTURE BOOK providing an electronic question and answer unit and associated book having a plurality of images therein. A selected one of an associated group of numbered printed pictorial presentations is randomly selected by the handheld learning aid and the operator attempts to correctly respond to the pictured object. Scoring functions and displayed reward phrases provide positive reinforcement of learned skills.

U.S. Pat. No. 4,611,995 issued to Sado sets forth an ELECTRONIC LANGUAGE LEARNING MACHINE having a memory within which a plurality of words are stored. A submemory having subdata relating to the words is also stored therein. A control unit connected to the memory and the submemory derive the stored words and related subdata and present the words and subdata on a display.

U.S. Pat. No. 4,164,078 issued to Goldfarb sets forth an ELECTRONIC QUIZ APPARATUS having a central unit which supports a plurality of buttons including a set of number buttons and a set of alphabet buttons. A further set of answer buttons and various functional buttons such as memory, clear, add, subtract, multiply and divide are also provided. The units supports a display for visual communication with the user.

U.S. Pat. No. 4,959,017 issued to Thompson, et al. sets forth an ELECTRONIC LEARNING DEVICE for teaching how to handle money. The student provides an input to the device which in a preferred embodiment is inputted by a plurality of keys selecting the learning activities and its difficulty level. The device requests that the student engage in randomly selected current identification and manipulation problems. A speech synthesizer and/or visual display serve to generate requests to the students concerning the students response.

U.S. Pat. No. 5,137,457 issued to Howard, et al. sets forth an ELECTRONIC TEACHING DEVICE which provides several mathematical activities to enhance the student's understanding of numbers by pictorially displaying the proper values. The target activity emphasizes logical reasoning and problem solving.

U.S. Pat. No. 5,139,423 issued to McCormack, et al. sets forth an ELECTRONIC TEACHING DEVICE which provides several mathematical activities including place value, trade, target, solve it, word problems, estimate, select and calculator. The various problems test the user's knowledge on an interactive basis.

U.S. Pat. No. 5,203,705 issued to Hardy, et al. sets forth a WORD SPELLING AND DEFINITION EDUCATIONAL DEVICE having an electronic spelling correcting machine which compares an input term against a list of terms in memory and validates spelling. Various games are incorporated to motivate the user. For purposes of game playing, the words incorrectly used from the user list are biased in such fashion that they are picked in a quasi-random fashion such that the words played incorrectly are selected with greater frequency than words played correctly.

U.S. Pat. No. 5,586,889 issued to Goodman sets forth a HANDHELD TEACH AND TEST DEVICE for recording individual answers to a set of questions selected from several sets of questions with each set having an identification code. The device includes a selector for entering an identification code to select one of the sets of questions. The indicator serially prompts for an answer to each question within the set. Response buttons are provided for entering an answer to each question.

U.S. Pat. No. 5,413,355 issued to Gonzalez sets forth an ELECTRONIC EDUCATIONAL GAME WITH RESPONSE ANIMATION having a housing supporting a response character which is animated directly responsive to input signals provided by the user. Preferably, the animated indicia comprises a distinctive character which produces animated movements of approval in response to questions being answered correctly while providing a negative animated reaction to an incorrect answer.

U.S. Pat. No. 5,030,101 issued to Ikemoto, sets forth a VOICE OUTPUT DEVICE FOR USE IN ELECTRONIC APPLIANCE having a first member for detecting generation of data concerning starting or completion of operation of the electronic appliance, a memory for storing messages to be verbally transmitted, a second member for selecting in response to an output signal from the first member and a third member for verbally transmitting the selected message to the operator.

While the foregoing described prior art devices have filled the need for interactive responsive teaching and self-learning devices relatively well, there exists a continuing need in the art for evermore interesting, amusing and entertaining educational type games in which the user is more strongly motivated to participate.

SUMMARY OF THE INVENTION

Accordingly, it is a general object of the present invention to provide an improved question and answer amusement device which is more motivating and then onerous than conventional teaching and learning devices in communicating knowledge to the user. It is a more particular object of the present invention to provide an improved question and answer amusement device which emphasizes the amusement aspects and which provides substantial communication of information during the amusement activities in a manner which virtually disguises the learning aspects.

In accordance with the present invention, there is provided a question and answer presenting amusement device comprising: a housing; a question/answer button and switch supported by the housing; a multiple segment display supported by the housing; and microprocessor means supported within the housing operatively coupled to the display and the question/answer switch, the microprocessor means operative in response to a first pressing of the question/answer button to display a first question on the display and operative in response to a second pressing of the question/answer button to display the answer to the first question upon the display, the microprocessor means operative without an answer input from the user.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
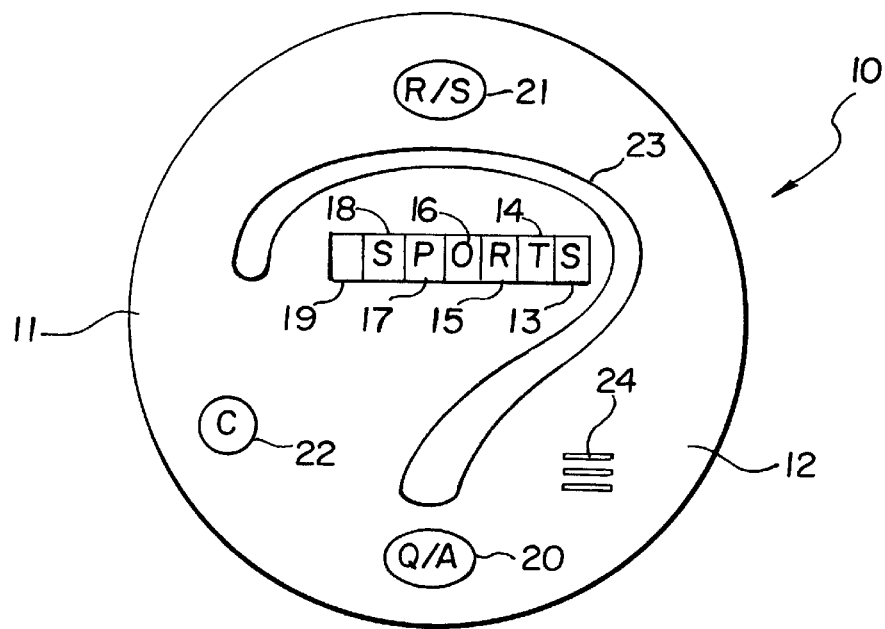
FIG. 1 sets forth a front view of a question and answer amusement device constructed in accordance with the present invention.

FIG. 1 sets forth a front view of a question and answer amusement device constructed in accordance with the present invention and generally referenced by numeral 10. Device 10 is preferably fabricated as a small handheld object which is pleasing to hold and which is small enough to fit into the user's pocket or, alternatively, be worn as an ornamental necklace or other use such as a keychain attachment and so on. In its preferred form, question and answer device 10 includes a housing 11 preferably formed of a molded plastic material or the like having a general disk shape and defining a front surface 12. Front surface 12 supports a raised highly visible ornamental element 23 comprising the upper portion of a stylized question mark.

Element 23 is strictly visual in function and has no further part in the application of the device. Housing 11 further supports a Q/A button 20 which provides a question and answer button operative in the manner described below. Also supported by housing 11 is an R/S button 21 which provides a repeat or skip input to device 10. A multisegment display 12 is supported within visual element 23 upon front surface 12 of housing 11. In its preferred form, display 12 comprises a liquid crystal display (LCD) formed of a plurality of display segments 13 through 19 arranged in a horizontal row. Finally, housing 11 further supports a category button 22 which in the manner described below is used in selecting from a plurality of categories in the embodiment of amusement device 10 in which plural categories of questions are stored within memory. In the event device 10 is fabricated without multiple categories but instead houses a single stored category set of questions and answers, button 22 is omitted and replaced with an ornamental object if desired. As is set forth below in greater detail, device 10 includes a microprocessor having an associated memory and timer responsive to inputs from buttons 20 through 22. The internal processor also includes a conventional display driver which arranges and formats the applied signals to display 12 to configure the individual character segments thereof. Finally, an audio circuit and sound synthesizing circuit is preferably provided within the circuit of device 10 by which an audio output is produced during game play. For purposes of convenience, the audio output device preferably comprises a piezoelectric transducer positioned behind a small grille 24 formed on front surface 12 of housing 11. It will be apparent to those skilled in the art, however, that different audio transducers and different locations of the output grille thereof may be utilized on device 10 without departing from the spirit and scope of the present invention.

In operation, device 10 utilizes a stored set of questions and answers manipulated by the apparatus set forth below in greater detail. Suffice it to note here that device 10 stores a plurality of questions and answers and facilitates game play as follows. In the absence of activity of buttons 20 or 21 for an extended period of time, device 10 "times out" and shuts down. Once a button selected from buttons 20 through 22 is pressed, the processor within device 10 is activated and a category is displayed upon display 12. Such category may, for example, be "sports" as illustrated in FIG. 1. Thereafter, the processor within device 10 selects the first question from among the plurality of stored questions and displays the question upon display 12. In accordance with the preferred fabrication of the present invention, the display of a question is "scrolled" across display 12 in a traveling motion similar to that used in scrolling marquees in various prior art devices. That is to say, the sentence forming the question is moved sequentially through display 12 progressing across segments 13 through 19 moving from left to right. The user then reads the displayed question. Once the question has been displayed, a variety of alternative performances take place. In the basic operation of the present invention, a time is initiated following the display of the question upon display 12 while the device waits for the user to press button 20. It will be noted that in accordance with an important aspect of the present invention, device 10 does not utilize answer inputs but rather simply receives an input indicating the user has an answer in mind. This departs substantially from the great bulk of the prior art devices which are relatively complex and which utilize some sort of answer input or answer selection from multiple possible answers as a teaching mechanism.

As the user ponders the displayed question and as the timer within device 10 times out, if the timer within device 10 times out the answer interval without there having been a pressing of button 20, the device then displays the answer in a similar scrolling motion across display 12. In accordance with the preferred embodiment of the present invention, the display of the answer following the timer having timed out without the user pressing button 20 causes device 10 to produce a negative audio output such as a "razz" sound or other audio information. This reflects the assumption of device 10 that the user has not formed an answer to the propounded question. Once again, it must be emphasized that the answer is not inputted by the user nor does device 10 evaluate the correctness of the answer since the answer is never communicated to device 10. Rather, the only determination made by device 10 is the pressing or nonpressing of question and answer button 20. This has been found to highly personalize the operation of device 10 and make it suitable for use virtually anywhere under virtually any circumstances. Further, it has been found that the removal of the need to input an answer and get an indication of correct or erroneous greatly reduces the intimidation barrier of the devices and heightens its amusement and entertainment. Importantly, however, in addition to amusement and entertainment, the user is being exposed to a series of questions and a learning effect does take place.

If during the timing interval of device 10 following a question display the user presses question and answer button 20, device 10 immediately displays the associated correct answer. As an alternative to the above-described operation, device 10 may be configured to simply present a question upon display 12 and wait for the user to press question and answer button 20. This has, however, been found less amusing and enjoyable than the above-described preferred operation.

Once the answer has been displayed in the above-described operation for a predetermined time interval, display 12 is cleared and device 10 waits for the user to again press question and answer button 20. Upon pressing question and answer button 20 for the second time, device 10 displays the next question stored in memory and the above-described cycle repeats. For convenience, it has been found preferable not to repeat the category following the first input of question and answer button 20 but rather to present a series a questions and answers directly thereafter. Thus, the above-described cycle continues and the user is able to sequence through the various questions stored in memory within device 10.

By way of a further alternative operation of the present invention device, a plurality of different question and answer sets organized by category may be stored within memory within device 10. This may be accomplished by simply providing a larger memory and instructions to the processor within device 10 or, alternatively, may utilize different memories. By way of further alternative, the memory devices within device 10 may be fabricated in an interchangable or plug-in manner. In the event multiple categories of operation are utilized in device 10, button 22 is provided upon housing 11 and utilized by the user to select a category. The user simply presses category button 22 and the identification of a category is displayed upon display 12. If the user then presses question and answer button 20, that category is selected. If, however, upon reading display 12 the user wants a different category, button 22 is again pressed and another category is provided. This cycle continues until question and answer button 20 is pressed.

The present invention amusement device also provides a repeat or skip operation manipulated by pressing button 21. If the user presses button 21 and releases it within a predetermined brief interval such as a half second or less, the last displayed question or answer is repeated upon display 12. If, however, the user presses repeat/skip button 21 and holds it beyond the predetermined interval, the device skips the question or answer being displayed. This allows the user to quickly move through a question which is somehow undesirable to access the next question and not need to cycle through the entire question and answer interval.

As a simpler alternate embodiment of the present invention, the microprocessor within housing 11 may be operated on a continuous basis in which it simply displays a question and waits for either the pressing of the question and answer button or a timed interval to then display the answer. Thereafter, the microprocessor automatically displays the next question and the cycle repeats. In such a simplified embodiment, an on/off switch is provided to interrupt game play.

Figure 2:
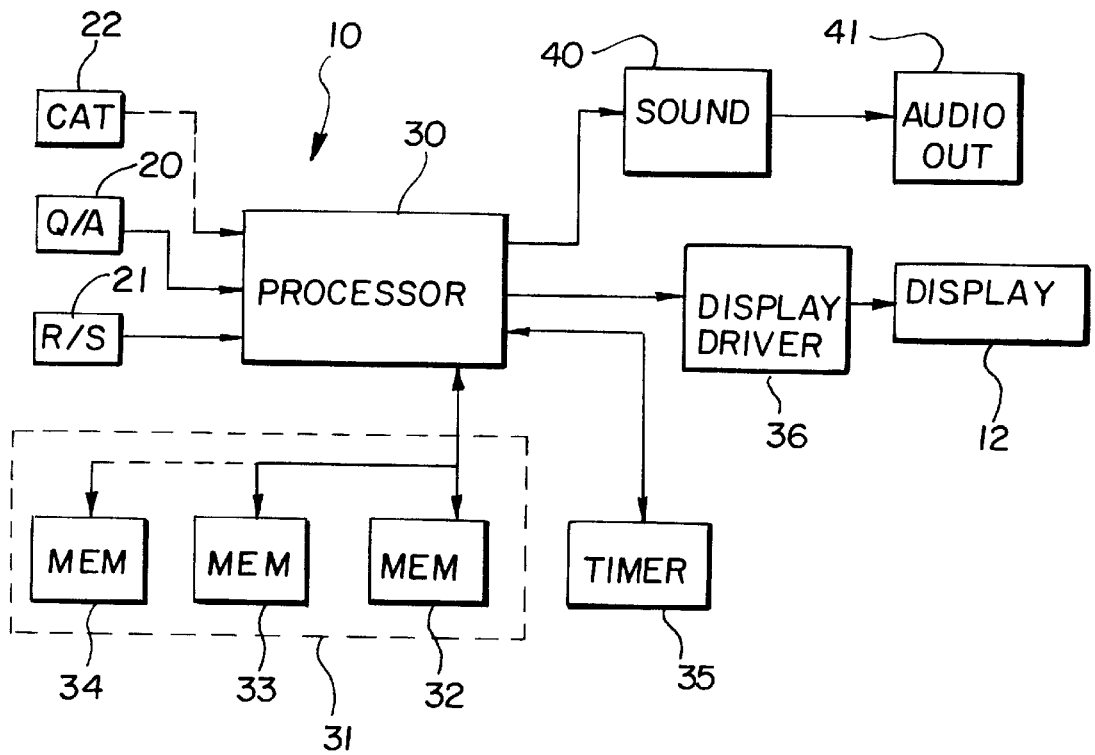
FIG. 2 sets forth a block diagram of the operative system within the present invention question and answer amusement device.

FIG. 2 sets forth a block diagram of the present invention question and answer amusement device. Amusement device 10 includes a processor 30 which in its preferred fabrication comprises a conventional eight-bit processor. Processor 30 utilizes an associated memory 31 which is shown in FIG. 2 to include a plurality of individual memories 32, 33 and an indeterminate number including memory 34. Alternatively, however, memory 31 may be fabricated of a single memory device within which various portions have been divided and designated to provide multiple category memories. By way of further alternative, a single memory such as memory 32 representing a single category may be utilized in combination with processor 30. The essential function of memory 31 however configured is to provide a plurality of stored questions and answers which processor 30 may access in accordance with the above-described operation of the present invention device. In addition, memory 32 stores a program which facilitates operation of processor 30 in accordance with a stored instruction set. As an alternative, however, processor 30 may utilize a read-only memory (ROM) to provide the operational program for the processor.

A plurality of user inputs to processor 30 includes question and answer button 20, repeat or skip button 21, and category button 22. Category button 20 is shown in dashed-line connection to processor 30 to indicate that category button 22 is optional or alternative in the present invention system. As described above, question and answer amusement device 10 is provided in alternative embodiments which include either a single category therefore removing the need for category button 22 or multiple categories in which case button 22 is provided and is coupled to an input of processor 30.

Processor 30 is coupled to a display driver 36 which in turn is coupled to a multisegment LCD display 12. As described above, display 12 provides a plurality of display segments (seen in FIG. 1) which are positioned upon device 10 and which are used to scroll questions and answers. Display driver 36 comprises a conventional display driver which in the embodiment of the present invention facilitates the use of an LCD display having eight five-by-seven matrix display elements. This allows eight characters to be displayed at any give time on display 12. It will be apparent to those skilled in the art, however, that a different display driver and display segment arrangement may be utilized having different numbers of matrix elements without departing from the spirit and scope of the present invention. The essential function of display 12 and display driver 36 is the communication by visual means to the user of questions and answers.

A conventional sound producer circuit 40 is operated under control of processor 30 and is coupled to a conventional audio output 41. In its preferred form to conserve space and minimize cost, audio output is preferably fabricated of a piezoelectric or similar compact audio transducer device. However, other devices such as small speakers or buzzers may be utilized without departing from the spirit and scope of the present invention. Sound circuit 40 provides sound signals in response to processor 30 which facilitate the creation of one or more sounds such as the above-mentioned "razz" sound. Timer 35 is utilized by processor 30 in timing out the various intervals described above in the operation of device 10. Timer 35 is implemented in accordance with conventional fabrication techniques and may, for example, include a counter which is combined with a clock signal provided by processor 30 or internally generated within timer 35. In a typical operation of timer 35, the timed interval is initiated by a command from processor 30 which starts the counter portion of timer 35 into the counting process as it counts applied clock signals. When so utilized, the particular intervals to be timed correspond to numbers of clock signals accumulated within the counter. Thus, for example, to time out the interval between display of a question and the display of an answer in the operation described above, intervals of the order of five or ten seconds may be convenient. Of course, virtually any interval may be utilized without departing from the spirit and scope of the present invention. In timing out the interval, processor 30 looks for an accumulated count within timer 35 which is interpreted as the timed interval and response by outputting the answer and resetting the counter within timer 35. It will be apparent, however, that while a counter and clock signal arrangement is convenient, timer 35 may be fabricated using virtually any timer device.

Processor 30 is fabricated in accordance with conventional fabrication techniques and may utilize virtually any conventional microprocessor circuit for operating in accordance with the present invention. In the implementation of the present invention, it has been found effective to utilize a microprocessor provided by Sunplus having device number SPL06A.

Thus, in the system shown in FIG. 2, the above-described operation of the present invention amusement device is carried forward in accordance with the operational flow diagram set forth below in FIG. 3.

Figure 3:
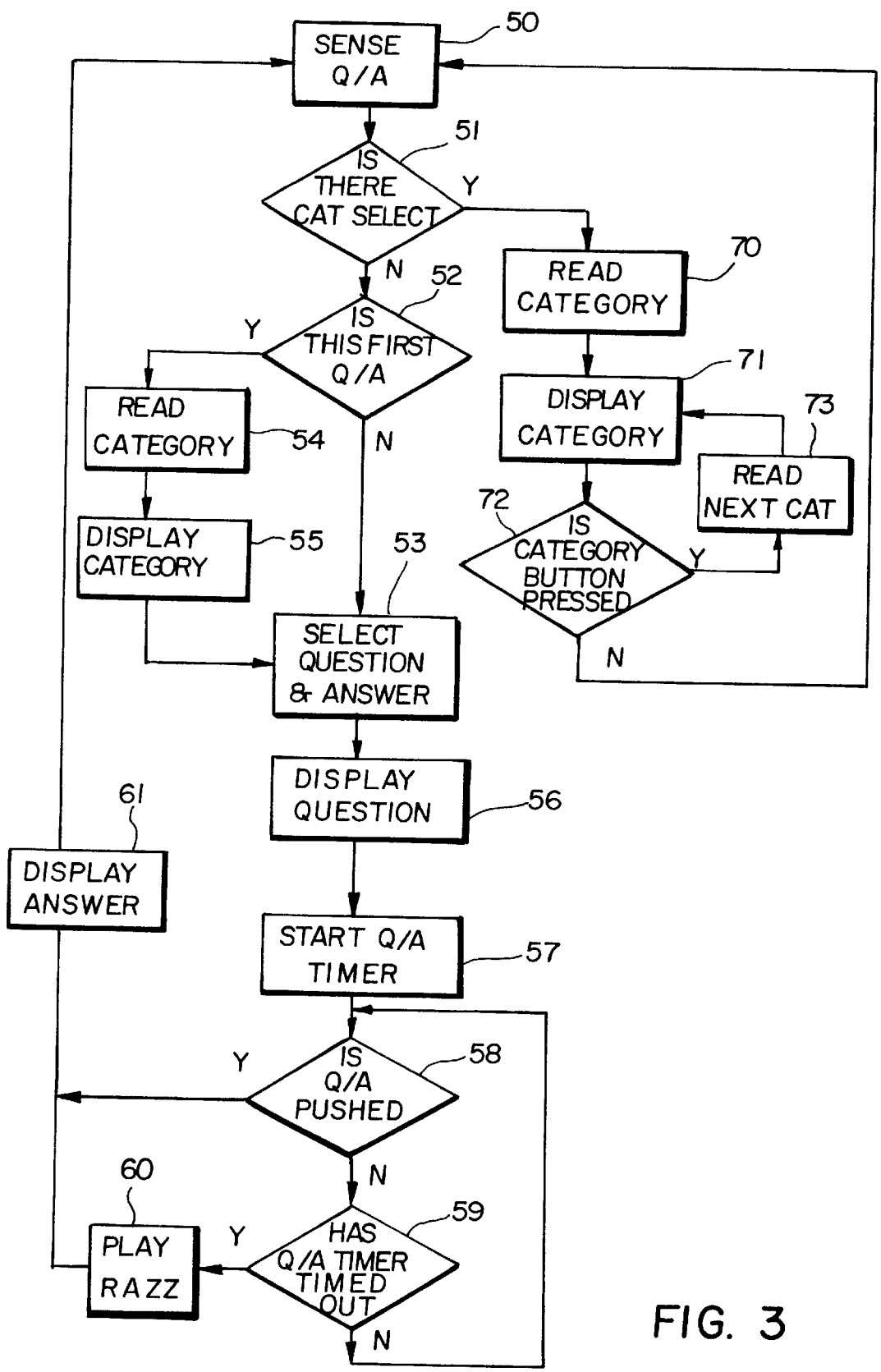
FIG. 3 sets forth an operational flow diagram describing the operation of the present invention question and answer amusement device.

FIG. 3 sets forth an operational flow diagram of the present invention question and answer amusement device. In essence, the flow diagram of FIG. 3 corresponds to the general instruction set provided for processor 30 in operating the present invention game. As mentioned above, in the preferred fabrication of the present invention game to conserve battery power, the circuit within the present invention amusement device shuts down after a predetermined interval in which no question and answer button input has been received. Following such a shutdown, the operation of the present invention system begins at step 50 in which the user having pressed the question and answer button is sensed. The system then moves to step 51 in which a determination is made as to whether the system utilizes selectable categories. If no selectable categories option is operating within the present invention system, the operation moves to step 52 in which a determination is made as to whether this is the first time following a shutdown that the question and answer button has been pushed. If this is not the case, the system moves to step 53 in which the next question and answer from the stored set of questions and answers is selected. This selection utilizes a simple memory arrangement and set of question and answer pointers within the memories to allow the incrementing of the pointers each time a question and answer is read from memory to sequence the system through the question and answer list.

If however a determination is made at step 52 that this is the first question and answer button input following a shutdown, the system moves to step 54 in which the present category is read and thereafter to a step 55 in which the category read is displayed. Following category display at step 55, the system moves to step 53 in which the selection of the next question and answer set is carried forward.

Following selection of the next question and answer, the system moves to step 56 in which the question is displayed upon the apparatus display. Following display of the question, the system moves to step 57 and initiates the timing interval of the question and answer timer. Thereafter, at step 58, a determination is made as to whether the question and answer button has been pushed. If the button has been pushed, the system moves to step 61 in which the answer corresponding to the displayed question is then displayed. Following display of the correct answer, the system returns to step 50 and awaits the next pressing of the question and answer button.

If, however, it is determined at step 58 that the question and answer button has not been pushed, the system moves to step 59 in which a determination is made as to whether the question and answer interval timer has timed out. If the timer has not yet timed out, the system returns to step 58. In essence, the system waits and cycles through steps 58 and 59 until either a question and answer button input is sensed or until the question and answer timer interval has been timed out. Thus, if the question and answer button has not been pushed and at step 59 the timed out interval is sensed, the system then moves to step 60 in which a negative response may be played such as the above-described "razz" audio output is played. The use of a razz output or any other negative response is optional and may be eliminated if desired. In such case, the system moves directly from step 59 to step 61 displaying the answer. If the razz signal is utilized, however, it is played and thereafter the system moves to step 61 displaying the correct answer afterwhich it returns to step 50 and awaits the next question and answer button action.

It will be recalled that at step 51 a determination is made as to whether the apparatus is operating with the option of selection from multiple categories. The above-described operation took place in the event that no category selection was present within the apparatus. If, however, it is determined at step 51 that the system is providing selection from among a plurality of categories, the system at step 51 moves to a step 70 in which the next category is read and thereafter to a step 71 in which the next category is displayed. At this point, the user may either select the displayed category by pressing the question and answer button or, alternatively, do nothing allowing the system to display the next category in the list. Accordingly, following the display of the next category at step 71, the system then determines at step 72 in which a determination is made as to whether the category button has again been pressed. If the category button has been pressed following display at step 71, the system then moves to step 73 and reads the next category which is then displayed at step 71. This cycle continues until the user ceases to press the category button. In effect, this allows the user to scroll through the list of categories available. Once it is determined at step 72 that a category button has not been pressed, the system returns to step 50 awaiting the next pressing of the question and answer button.

In the above-described operation, the present invention question and amusement device is further operated by a repeat or skip feature in response to button 21 (seen in FIG. 1). While not seen in FIG. 3, the operation of the repeat or skip feature functions as described above in response to the pressing of the repeat or skip button. When the user presses the repeat or skip button, system operation is interrupted and the point within the above-described operation to which the system returns is determined by the time interval for which the repeat or skip button is held depressed. If the repeat or skip button is pressed and released within a predetermined interval such as a half second or less, the system returns to the last previously displayed item and repeats the display. If however the repeat or skip button is held down beyond the predetermined half second interval, the system returns to step 53 and selects the next question and answer set and thereafter displays the next question at step 56 and so on. Thus, the repeat or skip button functions as an interrupter and override of the operational method set forth above in FIG. 3.

Figure 4:
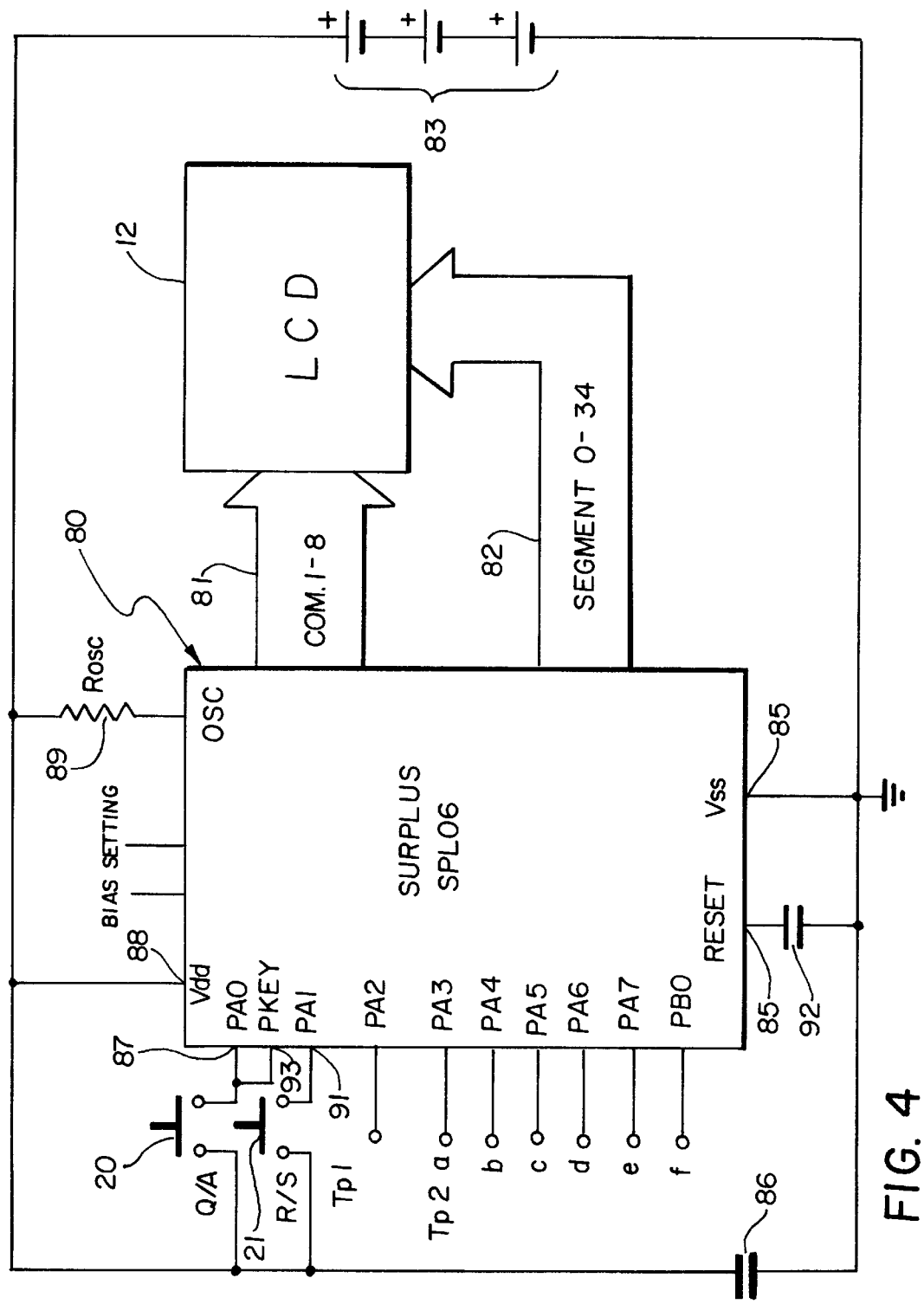
FIG. 4 sets forth a schematic diagram of the present invention question and answer amusement device.

FIG. 4 sets forth a schematic diagram of the preferred embodiment of the present invention question and answer amusement device. In the embodiment of the present invention shown in FIG. 4, an integrated circuit 80 has been selected to provide the majority of the above-described function shown in FIG. 2 and described in FIG. 3 in a single commercially available integrated circuit. Thus, integrated circuit 80 utilizes a microprocessor integrated circuit manufactured by Sunplus Corporation having identifying device number SPL06. It will be apparent, however, that other integrated circuit devices may be utilized without departing from the spirit and scope of the present invention. Integrated circuit 80 includes a plurality of functions internally supported and provides an eight-bit RISC microprocessor together with an internal memory having a program read-only memory and a static RAM memory utilized in storing questions and answers. A multisegment LCD display driver is also formed within integrated circuit 80. In addition, a sound generator and an audio output device are similarly formed. A timer, time base and interrupt logic system including an internal oscillator or clock generator is also provided within integrated circuit 80. The resistor 89 is coupled to oscillator connection 90 of integrated circuit 80 to control the frequency of clock signal. Similarly, operational power is coupled to operating voltage input 88 which is derived from a plurality of batteries 83. Integrated circuit 80 is coupled to liquid crystal display device 12 by a common segment coupling 81 and a matrix or segment input 82. As described above, appropriate matrix signals are supplied to display 12 by processor 80 to move questions and answers sequentially across display 12 in the above described scrolling action.

A ground connection 81 and a reset capacitor 92 are coupled to inputs 84 and 85 respectively. A filter capacitor 86 provides protection of integrated circuit 80 from spurious noise and the like which would otherwise be applied to operating voltage input 88. Question and answer button 20 is coupled between operating supply and input 87 of integrated circuit 80. Similarly, repeat or skip button 21 is coupled between operating supply and input 91. Thus, pressing either button 20 or 21 applies operating supply to inputs 87 or 91 respectively.

The processor is, as described above, normally shutdown in what is referred to as the "sleep mode". When the question and answer button is pushed, input 87 is raised to the operating supply voltage and input 93 is similarly energized. This initiates the operation of the processor or "wakes the processor". As the processor is initiated into operation, the timers are started and the registers and display memory are initialized.

Once the question and answer button is pressed again, the above-described operation in FIG. 3 takes place.

What has been shown is a novel question and amusement device which presents a series of questions and answers to an individual in a highly comfortable and pleasant manner. The amusement device avoids the intimidation which other more complex and demanding learning and teaching devices often create. In addition, the present invention device while communicating information provides a convenient and simple amusement device which may be utilized at various times of delay or relaxation in a convenient manner. The series of questions prompted and answers provided requires no interaction by the user other than pressing the question and answer button to initiate a question. Thus, the need to input answers and evaluate those answers and respond is removed from the device and the device becomes exceedingly friendly. The friendliness and amusement of the device are further enhanced by preferably utilizing a housing supporting the device which has an interesting, amusing and preferably entertaining aesthetic quality.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A question and answer presenting amusement device comprising:

a housing;

a question/answer button and switch supported by said housing;

a multiple segment display supported by said housing; and microprocessor means supported within said housing operatively coupled to said display and said question/answer switch, said microprocessor means operative in response to a first pressing of said question/answer button to display a first question on said display and operative in response to a second pressing of said question/answer button to display the answer to said first question upon said display, said microprocessor means operative without an answer input from the user.

2. The question and answer presenting amusement device set forth in claim 1 further including timer means within said microprocessor means operative following said display of said first question to time out a question/answer interval and, in the absence of said second pressing of said question/answer button, displaying the answer to said first question.

3. The question and answer presenting amusement device set forth in claim 2 wherein said microprocessor means responds to a third pressing of said question/answer button by displaying a second question on said display.

4. The question and answer presenting amusement device set forth in claim 3 wherein said microprocessor means displays said questions and answers on said display in a scrolling image.

5. An amusement device comprising:

a housing defining a front surface;

a microprocessor having a timer and associated memory within said housing, said memory having a stored program and a plurality of questions and associated answers stored therein;

a question/answer button and switch supported on said housing coupled to said microprocessor means; and a multiple segment display supported on said front surface coupled to said microprocessor means;

said microprocessor means operative under the control of said stored program; said program including
  (1) means for waiting for the pressing of said question/answer button;
  (2) means for displaying a question from said stored questions and start said timer in response to the pressing of said question/answer button;
  (3) means for waiting for either timed interval or another pressing of said question/answer button; and
  (4) means for displaying the answer associated with the previously displayed question in response to the pressing question/answer button or the end of the timed interval without an answer input from the user.

6. The amusement device set forth in claim 5 further including a repeat/skip button and switch supported on said housing and coupled to said microprocessor and wherein said microprocessor responds to pressing of said repeat/skip button to either skip a currently displayed question or repeat the last displayed question or answer as a function of the duration of pressing of said repeat/skip button.

7. The amusement device set forth in claim 6 wherein said memory includes a plurality of questions and associated answers arranged in category groups.

8. An amusement device comprising:

a housing defining a front surface;

a microprocessor having a timer and associated memory within said housing, said memory having a stored program and a plurality of questions and associated answers stored therein;

a question/answer button and switch supported on said housing coupled to said microprocessor means; and a multiple segment display supported on said front surface coupled to said microprocessor means;

said microprocessor means operative under the control of said stored program; said program including
  (1) means for waiting for the pressing of said question/answer button;
  (2) means for displaying a question from said stored questions and start said timer in response to the pressing of said question/answer button;
  (3) means for waiting for a timed interval; and
  (4) means for displaying the answer associated with the previously displayed question in response to the end of the timed interval without an answer input from the user.

9. An amusement device comprising:

a housing defining a front surface;

a microprocessor having a timer and associated memory within said housing, said memory having a stored program and a plurality of questions and associated answers stored therein;

a question/answer button and switch supported on said housing coupled to said microprocessor means; and a multiple segment display supported on said front surface coupled to said microprocessor means;

said microprocessor means operative under the control of said stored program; said program including
  (1) means for waiting for the pressing of said question/answer button;
  (2) means for displaying a question from said stored questions and start said timer in response to the pressing of said question/answer button;
  (3) means for waiting until said question/answer button is again pressed; and
  (4) means for displaying the answer associated with the previously displayed question in response to the pressing question/answer button without an answer input from the user.

10. An amusement device comprising:

a housing having a multiple segment display means and a question/answer button and switch;

means for storing a program and a plurality of questions and associated answers;

means for reading a first pressing of said question/answer button and displaying said question in a sequence under the control of said stored program; and means operative after each display of a question to display its associated answer without an answer input from a user.

11. The amusement device set forth in claim 10 wherein said means operative includes an interval timer timing a predetermined interval after a question is displayed.

12. The amusement device set forth in claim 11 wherein said means operative responds to wither said interval expiration or said pressing of said question/answer button.

* * * * *